Aug. 5, 1924.

W. C. HEDGCOCK 1,504,042

BRAKE MECHANISM

Filed Feb. 12, 1920

Witness:
R. Burkhardt.

Inventor:
William C. Hedgcock,
By Wilkinson, Huxley, Byron & Knight
Attys.

Aug. 5, 1924.
W. C. HEDGCOCK
BRAKE MECHANISM
Filed Feb. 12, 1920    2 Sheets-Sheet 2
1,504,042
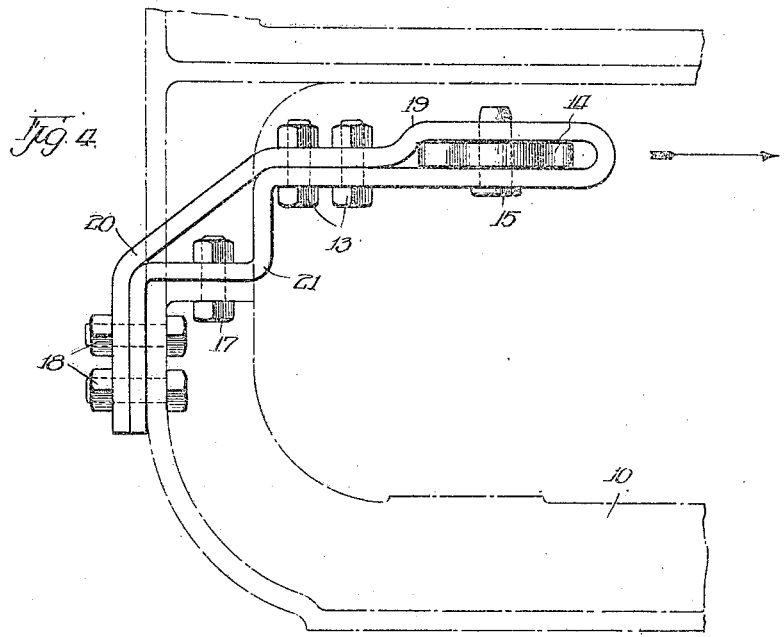
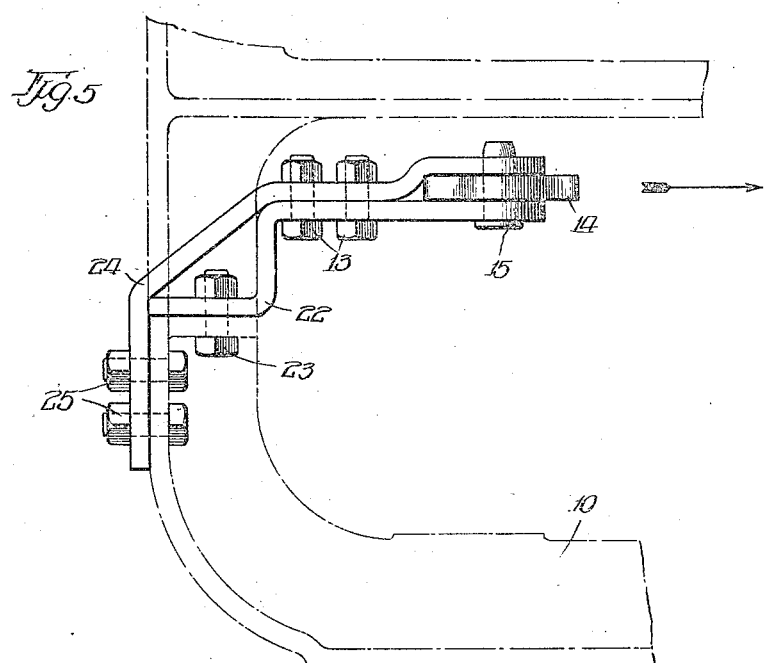

Patented Aug. 5, 1924.

1,504,042

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

Application filed February 12, 1920. Serial No. 358,201.

*To all whom it may concern:*

Be it known that I, WILLIAM C. HEDGCOCK, a citizen of the United States, residing at Chicago, in the county of Cook and State of Illinois, have invented certain new and useful Improvements in Brake Mechanism, of which the following is a specification.

This invention relates to brake mechanism. One object of the invention is to provide a lever fulcrum bracket, and particularly a dead lever fulcrum bracket which is light and easy to manufacture, and which at the same time provides the necessary rigidity and stiffness.

Another object is to provide a simple fabricated lever fulcrum bracket adapted to meet the various requirements of successful commercial operation.

These and other objects are accomplished by means of the arrangements disclosed on the accompanying sheets of drawings, in which—

Figure 4 is a fragmentary plan view of a truck side frame embodying a modification of my invention; and, Figure 5 is a similar view showing a further modification of my invention.

The various novel features of the invention will be apparent from the following description and drawings and will be particularly pointed out in the appended claims.

The equipment which I have shown herein is particularly adapted for the clasp type of brake, wherein there is a brake beam on each side of each pair of wheels and the brake levers and pull rods are duplicated on each side of the truck.

Figure 1:
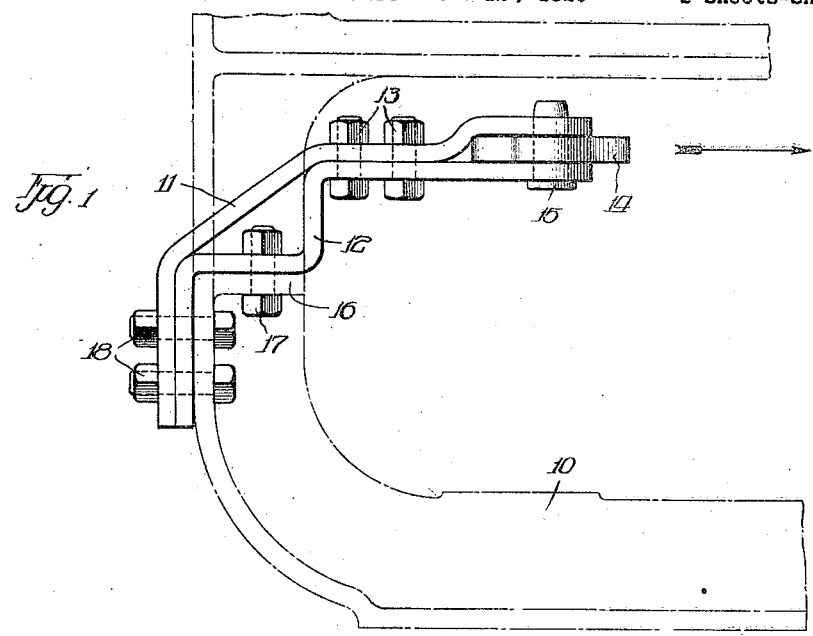
Figure 1 is a fragmentary plan view of a truck frame embodying my invention.
Figure 2:
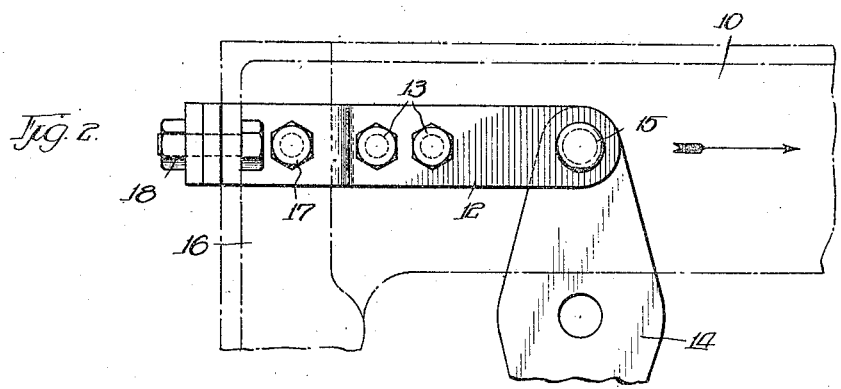
Figure 2 is a fragmentary side elevation of the same.
Figure 3:
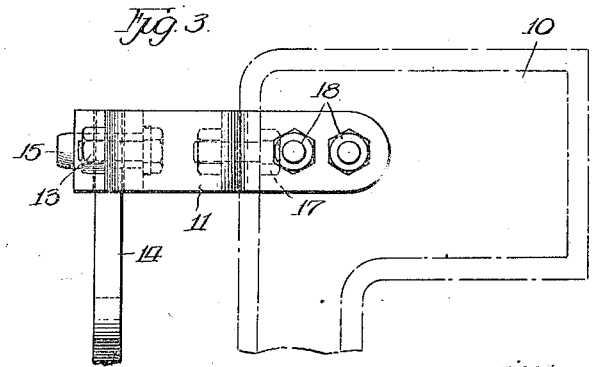
Figure 3 is a fragmentary end elevation of the same arrangement.

Referring to Figures 1, 2 and 3 of the drawings, it will be noted that I have shown a truck frame 10 to which my improved dead lever fulcrum bracket is secured, the bracket including two elements, a tension element 11 and a compression element 12. Intermediate the ends of said tension and compression elements they are secured together by any suitable means, such as bolts 13, said elements being spaced from each other forwardly thereof for the reception of the upper end of a dead brake lever 14. The upper end of this brake lever 14 is pivotally secured to the bracket between the tension and compression elements by a pin 15 which extends through registering openings in said tension and compression elements 11 and 12, respectively, and in the brake lever 14. The compression element 12 is attached to the truck frame at 16, where it abuts the latter, by any suitable means, such as a bolt 17, and together with the tension member 11 is again attached to the truck frame, where the tension and compression members 11 and 12 hook around the corner of the frame 10, the connection being made by any suitable means, such as by bolts 18. If it is desired to rivet or weld the parts in question instead of bolting same, such may be done and be within the spirit and scope of the invention. With the parts thus arranged portions of the compression element form sides of a triangle, of which a portion of the tension member forms the base.

When the brakes are applied the upper or pivoted end of the lever 14 exerts a pull or force upon the bracket in the direction indicated by the arrow. This force is resisted by the tension in the inclined element 11 and the compression in the strut or compression element 12, a truss action accordingly being effected. To insure proper action of the two elements of the bracket against each other, they are connected intermediate their ends by the bolts 13, as hereinabove mentioned.

A modification of the invention is shown in Figure 4 of the drawings, in which a single member 19 is provided and bent back upon itself to form the tension and compression elements 20 and 21, respectively. Otherwise the arrangement is the same as that shown in Figures 1, 2 and 3 of the drawings.

A further modification is shown in Figure 5 of the drawings. The compression member 22 does not hook around the corner of the truck frame, but is held in place merely by any suitable means, such as the bolt 23, the tension element 24 alone receiving the fastening means, such as the bolts 25, which secure said tension member to the side frame.

It will be seen that in addition to receiving the pull of the dead lever in the direction of the arrow, the bracket also serves as a support for carrying the dead lever, the connection being the pin 15. These brackets preferably are of forged steel and accordingly are light and easy to manufacture. The truss arrangement, however, makes it possible for the bracket to withstand all of the forces exerted against it.

It is my intention to cover all modifications of the invention falling within the spirit and scope of the following claims.

I claim:

1. In brake mechanism, a lever bracket including a tension member and a compression member directly secured to each other at spaced points, intermediate portions of said members being spaced from each other and cooperating to form a truss to resist operative forces transmitted thereto.

2. In brake mechanism, a lever bracket including tension and compression elements spaced at one point to receive a lever and spaced from each other at another point to form a truss for resisting operative forces, said elements being connected to each other at points on opposite sides of the truss portion to improve the truss action.

3. In brake mechanism, the combination of a truck frame, a lever bracket including tension and compression members secured to said truck frame, said tension and compression members being directly secured to each other at spaced points, intermediate portions of said tension and compression members being spaced from each other and cooperating to form a truss to resist operative forces transmitted thereto.

4. In brake mechanism, the combination of a truck frame, a lever bracket including tension and compression members secured to said truck frame, said tension and compression members being directly secured to each other at spaced points, intermediate portions of said members being spaced from each other and cooperating to form a truss to resist operative forces transmitted thereto, said members being spaced at another point to form a lever jaw, and a lever pivotally connected to said bracket in said lever jaw.

Signed at Chicago, Illinois, this 5th day of February, 1920.

WILLIAM C. HEDGCOCK.